N. J. GONDOLF.
FLUSHING APPARATUS.
APPLICATION FILED MAY 18, 1912.
1,059,146.
Patented Apr. 15, 1913.
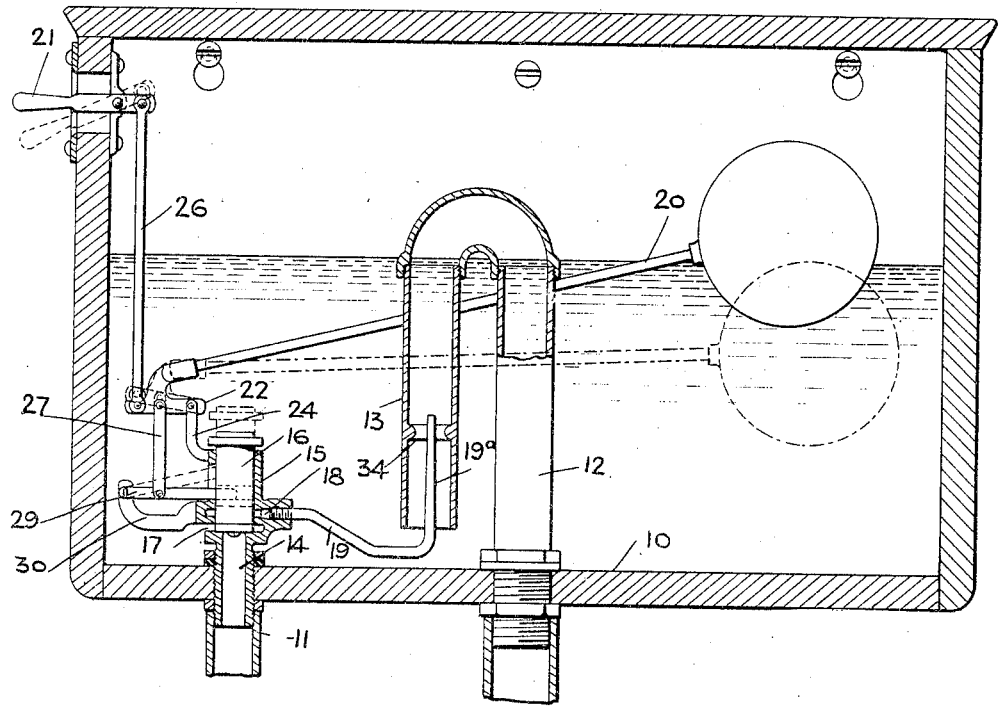
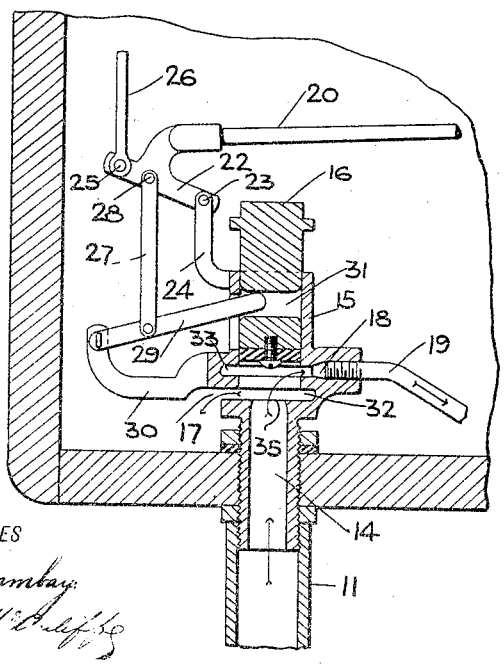
WITNESSES
INVENTOR
Nicholas J. Gondolf
BY
ATTORNEYS

UNITED STATES PATENT OFFICE.

NICHOLAS JOSEPH GONDOLF, OF NEW ORLEANS, LOUISIANA.

FLUSHING APPARATUS.

1,059,146.                Specification of Letters Patent.     Patented Apr. 15, 1913.

Application filed May 18, 1912. Serial No. 698,117.

*To all whom it may concern:*

Be it known that I, NICHOLAS J. GONDOLF, a citizen of the United States, and a resident of New Orleans, in the parish of Orleans and State of Louisiana, have invented a new and Improved Flushing Apparatus, of which the following is a full, clear, and exact description.

My invention relates to that class of flushing apparatus in which there is a siphon, and means for starting the action of the siphon.

It is a design of my invention to provide for starting the siphon by a jet of water supplied directly by the water supply pipe, and the invention has also for its design to provide a valve controlling both the water inlet pipe and the jet pipe for starting the siphon. The valve is so arranged as to close the branch leading to the siphon and the inlet pipe in succession, so that the branch pipe is first closed and then the inlet pipe.

An object of the invention also is to so form and arrange the casing of the mentioned controlling valve that an ample supply of water will be supplied to the jet pipe leading to the siphon.

The invention will be particularly explained in the specific description hereinafter to be given.

Reference is to be had to the accompanying drawings forming a part of this specification, in which similar characters of reference indicate corresponding parts in all the views.

Figure 1 is a vertical section of a flushing tank provided with a flushing apparatus embodying my invention; and Fig. 2 is a fragmentary vertical section on a larger scale.

Referring to the structural form illustrated, the tank 10 has an inlet pipe 11 and a siphon 12, of which the shorter leg is indicated at 13 and terminates adjacent to the bottom of the tank 10. The inlet pipe 11 may be provided with a nipple 14, or equivalent fitting forming a connection between the inlet pipe 11 and the casing 15 of a piston valve 16. From the casing 15 an outlet 17 leads to the interior of the tank, and an outlet 18 communicates with a branch pipe 19, the outer end of which is upturned and extends within the shorter leg 13 of the siphon, as at 19ª. The float arm 20 connects with the starting lever 21 by connecting elements hereinafter described, and acts also to raise the valve, preferably through a system of compound levers. Thus the float arm 20 is provided with a depending T-head 22 fulcrumed at one end, as at 23, on a bracket arm 24 carried by the valve casing 15, while the opposite end of the T-head 22 connects, as at 25, with a connecting rod or pull rod 26, the upper end of which connects with the mentioned starting lever 21. A link 27 may connect at its upper end, as at 28, with the T-head 22 at about the center, so that the T-head acts as a lever in connection with the link 27; the lower end of the link connects with a valve-engaging arm or lever 29, which is fulcrumed at its outer end on a bracket arm 30 that is supported on the valve casing 15, and may be integral therewith. The connection between the link 27 and the valve lever 29 is at a point between the ends of said lever, and the free end of the lever 29 extends into a recess or slot 31 in the valve 16.

The valve casing 15 adjacent to the outlet 17 leading to the tank, is provided with an annular chamber 32, communicating with the interior of the nipple 14 and with the outlet 17 in order to maintain an ample supply of water at this point. Similarly, there is formed adjacent to the outlet 18 leading to the branch 19 an annular chamber 33 communicating with the interior of the valve casing and with the said outlet 18, in order to insure an ample supply of water leading to the said outlet.

The short leg 13 of the siphon may be formed with an internal bead 34 to provide a contraction in the said leg adjacent to the extreme end of the upwardly projecting member 19ª of the branch pipe, so that the jet of water directed through the said branch pipe upwardly into the leg may be more effective in starting the siphon action by causing an overflow in the leg.

With the described construction, it will be seen that when the lever 21 is pulled downward, the connecting rod 26 will tilt the T-head 22 and the arm 20 on the fulcrum 23, which will cause the link 27 to swing the lever 29 on the bracket 30 and throw the free end of the lever upward, carrying the valve 16 from its seat 35 in the valve casing 15. Immediately upon the valve rising from its seat, water will flow through the outlet 17 to the tank, and as the valve rises farther, it will pass beyond the outlet 18 leading to the branch pipe, so that water will now flow also from the inlet pipe 11 through the nipple 14 to the branch pipe 19 and be directed in the form of a jet into the leg 13 of the siphon, causing an overflow in the said leg and starting the siphon action. The tank having been emptied and the siphon action stopped, the water from the outlet 17 will gradually fill the tank. As the tank fills, and the valve 16 is lowered by the float, the valve will first cut off the branch pipe 19 so that the siphon action cannot be again started until the starting lever is pulled. As the water continues to rise in the tank, the float will eventually move the valve 16 downward to its seat 35, closing the inlet pipe 11.

An important advantage of the described construction is that the full flow of water is obtained to the tank and to the siphon leg for starting the siphon, and by moving the valve only a very short distance. The construction also insures that the branch leading to the siphon leg is cut off while the tank is partially filled, to avoid the possibility of the siphon starting again.

Having thus described my invention, I claim as new and desire to secure by Letters Patent:

1. An inlet valve for flushing tanks comprising a casing having means at one end for connection with an inlet pipe, an outlet for discharging water to the tank, and another outlet for receiving a connection to a siphon, and a valve movable in said casing, the said valve in its closing movement first closing the said second outlet and then closing the first-mentioned outlet.

2. An inlet valve for flushing tanks, comprising a casing having means for connection with an inlet pipe, a side outlet for discharging water to the tank, another side outlet for receiving a connection to a siphon, the said casing having interior annular grooves leading to said outlets, and a cylindrical valve movable in said casing, the said valve in its closing movement first closing the said second outlet and then closing the first-mentioned outlet, the valve in its opening movement opening said outlets in the reverse succession.

3. An inlet valve for flushing tanks, comprising a cylindrical casing and a cylindrical valve movable axially in said casing, the casing being open at one end and having at said end means for connection with an inlet pipe, the casing furthermore having a valve seat surrounding the bore thereof, at a point between the ends, on which the valve may seat, an outlet to the tank adjacent to said valve seat, and a second outlet adapted to be connected with a siphon, the valve being movable in succession past the two outlets, and to and from the mentioned valve seat, the opening movement of the valve serving to open the tank outlet and the siphon outlet in the mentioned order, and in its closing movement serving to first close the siphon outlet and then the tank outlet.

In testimony whereof I have signed my name to this specification in the presence of two subscribing witnesses.

NICHOLAS JOSEPH GONDOLF.

Witnesses:
 LESTER C. SMITH,
 JNO. D. NIX